C. F. GRAY.
BELT FOR TRANSMITTING POWER.
APPLICATION FILED JUNE 5, 1907.
929,760.
Patented Aug. 3, 1909.
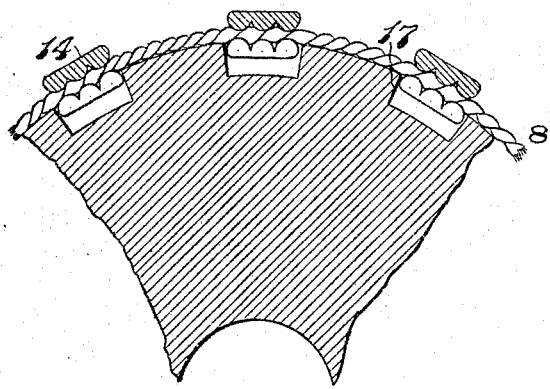
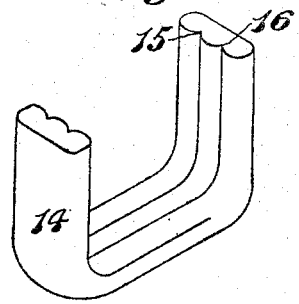
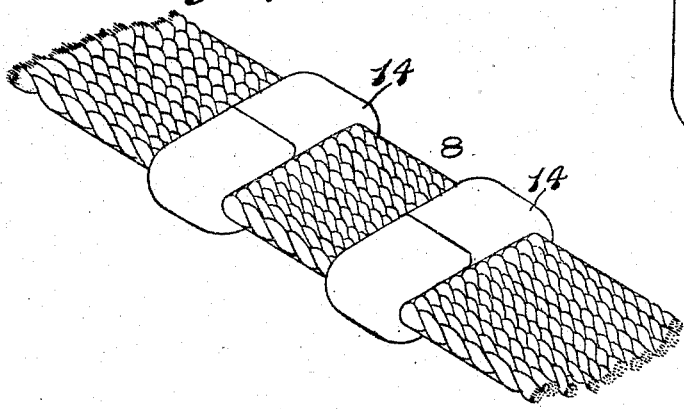
WITNESSES:
Albert K. Williams Jr.
Abbie M. Donihue
INVENTOR.
CHAS. F. GRAY.
BY
F. W. Ostrom
ATTORNEY.

UNITED STATES PATENT OFFICE.

CHARLES F. GRAY, OF SIERRA MADRE, CALIFORNIA, ASSIGNOR TO THE SINGER MANUFACTURING COMPANY, A CORPORATION OF NEW JERSEY.

BELT FOR TRANSMITTING POWER.

No. 929,760.      Specification of Letters Patent.      Patented Aug. 3, 1909.

Application filed June 5, 1907. Serial No. 377,297.

*To all whom it may concern:*

Be it known that I, CHARLES F. GRAY, a citizen of the United States, and a resident of Sierra Madre, in the county of Los Angeles and State of California, have invented certain new and useful Improvements in Belts for Transmitting Power, of which the following is a specification.

This invention relates to improvements in belt connections for sewing machines wherein the rotary movements of the needle-actuating and loop-taker actuating shafts must be constant and of uniform regularity, as in maintaining the operative relationship between the needle and loop-taker at the time that the needle presents the loop of needle thread to the action of the loop-seizing point of the loop-taker.

The belt herein illustrated and described is intended as an improvement upon the belt illustrated and described in United States Patent No. 667,830, issued February 12, 1901, to A. Steward.

In attempting to apply belts of the construction pointed out in the above referred to patent, to sewing machines employed for, what is termed, "cycle sewing", such machines as are commonly employed for buttonholing, button sewing, eyeleting, tacking, barring, etc. and operated in connection with a stop-motion device for automatically arresting the action of the stitch-forming and cloth-feeding mechanisms at the completion of a cycle of overseaming, it has been found that the sudden stopping of the machine would, in some instances, cause the clamps to be moved slightly out of adjustment with the coacting grooves formed in the belt pulleys. To overcome this difficulty I have provided the belt with equidistantly arranged clamps provided with corrugations into which portions of the fibrous material of the belt are forced by the act of securing the clamps upon the main portion of the belt.

In the accompanying drawings illustrating the invention, in the several figures of which like parts are similarly designated, Figure 1 is a view of a section of a belt driving pulley and a portion of a belt equipped with interiorly corrugated clamps, the latter shown in cross section. Fig. 2 is a view in perspective of a section of belt equipped with the construction of clamp shown in Fig. 1 and Fig. 3 is an enlarged view in perspective of the clamps shown in Figs. 1 and 2.

8 represents a portion of the belt and 14 a construction of clamp wherein the belt contacting surfaces are provided with corrugations 15 and 16, into which the fibrous material of the belt is forced in attaching the clamp to the belt.

In the operation of the belt, the walls 17 of the grooves formed in the pulley, tend to force the clamps out of adjustment in the direction of the travel of the belt, and the oppositely arranged walls of said grooves tend to force the clamps in an opposite direction, and this continued action of the walls of the grooves upon clamps formed without corrugations tends to iron down the fibrous material of the belt and cause the clamps to loose their hold upon the material, thus producing increased liability of the belt to become weakened by the wear incident to the oppositely directed movements of the clamps upon the belt, and the liability of the clamps to mount the peripheral surface of the pulley instead of entering the grooves formed in said pulley.

By the employment of clamps provided with corrugations into which portions of fibrous material of the belt are forced by the act of securing the clamps, increased resistance is effected without increasing the weight of frictional contact of the clamps at any one point, thus increasing the utility of the belt to an extent that adapts it for use in connection with machines equipped with stop-motion devices and employed for cycle sewing, without impairing it for use in connection with more delicately constructed and lighter running machines, such as are termed "high speed" and employed mainly in connection with the stitching of cotton or linen productions, such as shirts, collars, cuffs, muslin underwear, etc.

What I claim is:—

A belt connection for sewing machines comprising fibrous material provided with equi-distantly arranged interiorly corrugated clamps into which portions of said material are forced by the act of securing said clamps.

Signed at Sierra Madre, in the county of Los Angeles and State of California, this 28th day of May, A. D. 1907.

CHARLES F. GRAY.

Witnesses:
     JOHN C. PEGLER,
     N. H. HOSMER.